(12) United States Patent
Ushiro

(10) Patent No.: US 9,423,867 B2
(45) Date of Patent: Aug. 23, 2016

(54) POWER SUPPLY CONTROL FOR AN IMAGE FORMING APPARATUS

(71) Applicant: CANON KABUSHIKI KAISHA, Tokyo (JP)

(72) Inventor: Takahiro Ushiro, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 540 days.

(21) Appl. No.: 13/800,246

(22) Filed: Mar. 13, 2013

(65) Prior Publication Data

US 2013/0283071 A1 Oct. 24, 2013

(30) Foreign Application Priority Data

Apr. 18, 2012 (JP) ................. 2012-094781

(51) Int. Cl.
*G06F 1/00* (2006.01)
*G06F 1/32* (2006.01)
*G03G 15/00* (2006.01)

(52) U.S. Cl.
CPC .............. *G06F 1/3296* (2013.01); *G03G 15/80* (2013.01)

(58) Field of Classification Search
CPC .... G03G 15/5004; G03G 15/205; G06F 1/32; G06F 1/3284; G06F 1/3287
See application file for complete search history.

(56) References Cited

U.S. PATENT DOCUMENTS

| | | | | |
|---|---|---|---|---|
| 4,134,050 A | * | 1/1979 | Sibalis | ................. E05F 15/668 318/267 |
| 5,601,178 A | * | 2/1997 | Zaharia | ................. B66B 25/00 198/323 |
| 5,991,466 A | | 11/1999 | Ushiro et al. | |
| 6,577,825 B1 | * | 6/2003 | Gonnella, Jr. | ...... G03G 15/5004 399/38 |
| 2003/0178957 A1 | * | 9/2003 | Fitzgibbon | ................ H02P 1/44 318/280 |
| 2007/0252545 A1 | * | 11/2007 | Callentine | ................. H02P 3/18 318/280 |
| 2007/0293208 A1 | * | 12/2007 | Loh | ....................... H04L 12/282 455/419 |
| 2009/0294150 A1 | | 12/2009 | McGinley | |
| 2012/0043922 A1 | * | 2/2012 | Jackson | .................... H02P 3/18 318/813 |

(Continued)

FOREIGN PATENT DOCUMENTS

| | | |
|---|---|---|
| CN | 101339416 A | 1/2009 |
| CN | 101841246 A | 9/2010 |

(Continued)

OTHER PUBLICATIONS

Chinese Office Action dated May 18, 2015 in corresponding application No. 201310135835.3.

(Continued)

*Primary Examiner* — Chun Cao
*Assistant Examiner* — Zhipeng Wang
(74) *Attorney, Agent, or Firm* — Fitzpatrick, Cella, Harper & Scinto

(57) ABSTRACT

A power supply control circuit includes: a power supply unit that outputs the DC voltage for the load operation; a first switch of which opening/closing is controlled by applying the DC voltage from the power supply unit; a second switch which is manually operated to switch over the power supply; and a control unit. The second switch achieves a first state when not manually operated, and achieves a second state when manually operated. The control unit closes the first switch, if the second switch is changed to the second state and thereafter changed to the first state, when the second switch is in the first state and the DC voltage output from the power supply unit is not less than a predetermined value.

10 Claims, 6 Drawing Sheets

(56) References Cited

U.S. PATENT DOCUMENTS

2012/0127517 A1* 5/2012 Oh .................... G03G 15/5004
358/1.15
2014/0063674 A1* 3/2014 Ghoreishi .............. H01H 33/36
361/115

FOREIGN PATENT DOCUMENTS

| CN | 101847930 A | 9/2010 |
| CN | 101931332 A | 12/2010 |
| CN | 102381030 A | 3/2012 |
| JP | 10-268713 | 10/1998 |
| JP | 10-268713 A | 10/1998 |
| JP | 2001-228937 | 8/2001 |
| JP | 2005-218162 | 8/2005 |
| JP | 2007-116789 | 5/2007 |
| JP | 2008-234386 | 10/2008 |
| JP | 2008-262295 | 10/2008 |

OTHER PUBLICATIONS

Japanese Office Action issued Mar. 8, 2016 during prosecution of related Japanese application No. 2012-094781.
Japanese Office Action issued May 31, 2016 during prosecution of related Japanese application No. 2012-094781.

* cited by examiner

POWER SUPPLY CONTROL FOR AN IMAGE FORMING APPARATUS

BACKGROUND OF THE INVENTION

1. Field of the Invention

The present invention relates to a power supply control device for controlling a power switch of an image forming apparatus such as a copier, a printer, a facsimile, or a printmaking system that forms an image through electrophotography.

2. Description of Related Art

Image forming apparatuses are provided with a power switch for manually turning on/off the power supply by a user in a state where a power plug is inserted into an outlet. Further, in some image forming apparatuses, in order to suppress waste of electric power, there is provided an automatic power-off mechanism, which automatically turns off the power switch, in a case where the image forming apparatus is not operated during a predetermined period of time.

Japanese Patent Application Laid-Open No. H10-268713 discloses an image forming apparatus having a conventional automatic power-off mechanism. In the image forming apparatus, an electromagnetic coil is provided in a power switch which is manually operable. By energizing the electromagnetic coil, the power switch is turned on or off, and thus energization/de-energization of the electric power supplied from the power plug to the image forming apparatus is switched over.

Like Japanese Patent Application Laid-Open No. H10-268713, in the operation of the power switch using the electromagnetic coil, in order to prevent a user from performing an erroneous operation, a force (hereinafter referred to as an "operational force"), which prevents the energization/de-energization of the electric power from being switched over when the power switch is slightly touched, is necessary. In order to operate the power switch by applying a force corresponding to the operational force when the power supply is automatically turned off, a substantially strong electromagnetic coil is necessary. Hence, the size of the manual power switch using the electromagnetic coil tends to be large, and the costs thereof also tend to be high. Further, since the electromagnetic coil is strong, the electric energy at the time of driving the electromagnetic coil is large. Thus, it is difficult to reduce power consumption. In particular, it is necessary to maintain an electric power for driving the electromagnetic coil during the standby time, and thus it is difficult to reduce power consumption.

SUMMARY OF THE INVENTION

It is an object of the present invention to provide a power supply control device capable of achieving lower power consumption with a small size and low costs.

According to a first aspect of the present invention, there is provided a power supply control device for equipment including: a power supply unit which inputs AC power and outputs a DC voltage for operating a load inside the equipment; a first switch of which opening/closing is controlled by applying the DC voltage which is output by the power supply unit; a second switch which is manually operated to switch over ON/OFF of the power supply for the equipment, and achieves a first state when not manually operated and achieves a second state when manually operated, wherein the second switch is connected to the first switch in series, and wherein the second switch reduces the DC voltage, which is output by the power supply unit, to less than a predetermined value when the first switch is closed, in the first state, and opens the first switch in the second state; and a control unit which closes the first switch so as to reduce the DC voltage to less than the predetermined value, if the second switch is changed to the second state and thereafter changed to the first state, when the second switch is in the first state and the DC voltage is not reduced to less than the predetermined value.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

An exemplary embodiment of an image forming apparatus to which a power supply control device of the present invention is applied will be described.

Figure 1:
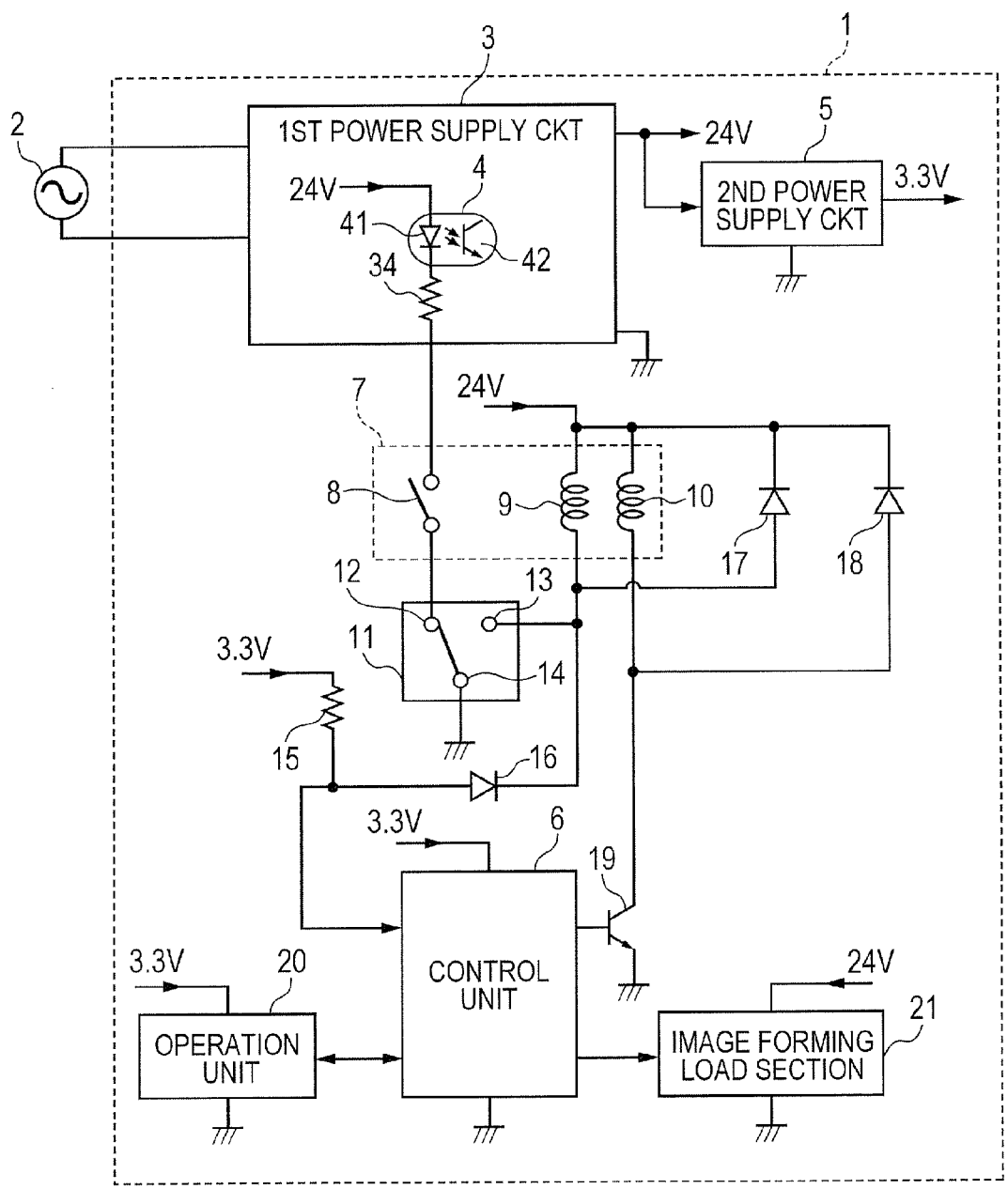
FIG. 1 is a configuration diagram of an image forming apparatus in which a configuration of a power switch portion is illustrated in detail.

FIG. 1 is a configuration diagram of an image forming apparatus 1 in which a configuration of a power switch portion is illustrated in detail. The image forming apparatus 1 is supplied with AC power from an AC power supply 2 such as an external commercial power supply. The AC power supply 2 supplies the AC power of which the voltage is for example 100[V] at a frequency of 50 [Hz]. It should be noted that the AC power is an example, and the frequency may be 60 [Hz], or the voltage may be 120[V] or 230[V], in accordance with the environment of usage of the image forming apparatus 1.

A first power supply circuit 3 generates and outputs a DC output voltage of 24[V] on the basis of the AC power which is input from the AC power supply 2. The output voltage of the first power supply circuit 3 is supplied to each mechanism for forming an image in the image forming apparatus 1. Examples of the mechanisms for image formation include an image reading mechanism, an image forming mechanism, and a conveying mechanism that conveys a printing medium such as sheets of paper. In FIG. 1, the mechanisms are collectively referred to as an image forming load section 21. The image forming load section 21 includes components, for which a voltage of 24[V] is necessary, such as a motor, a solenoid, and a semiconductor laser. Hence, the output voltage of the first power supply circuit 3 is necessary. The image reading mechanism reads an image from an original document. The conveying mechanism conveys the printing medium to the image forming mechanism. The image forming mechanism forms the image, which is read by the image reading mechanism, on the printing medium which is conveyed.

The first power supply circuit 3 includes a photo-coupler 4 that has a light emitting element 41 and a light receiving element 42. The gap between the light emitting element 41 and the light receiving element 42 of the photo-coupler 4 is insulated against the voltage of 3 [kV]. The output voltage of the first power supply circuit 3 is applied to the photo-coupler 4. As the current flowing in the light emitting element 41 of the photo-coupler 4 increases, the output voltage of the first power supply circuit 3 decreases. Hence, the photo-coupler functions as means for suppressing the output voltage. The detailed description of the first power supply circuit 3 will be given later.

The output voltage of the first power supply circuit 3 is supplied to a second power supply circuit 5. The second power supply circuit 5 converts the output voltage of 24[V], which is supplied from the first power supply circuit 3, into a DC output voltage of 3.3[V]. The converted voltage is supplied to electronic devices such as a CPU (Central Processing Unit) inside the image forming apparatus 1.

A control unit 6 is an example of the electronic device, and is implemented by, for example, the CPU. The control unit 6 performs operation control of the entire image forming apparatus 1. For example, by reading a predetermined program from a memory, not shown in the drawing, and executing the program, the image forming load section 21 is controlled to achieve an image forming process using the image forming apparatus 1. Further, by controlling a switching operation of a transistor 19, an operation of a two-winding latching relay 7 is controlled.

An operation unit 20 is an example of the electronic device to which the output voltage of the second electronic circuit 5 is input. The operation unit 20 has a key switch group for inputting an instruction and an indicator that indicates information. The contents of the operation performed by the operation unit 20 are input to the control unit 6. A user is able to input an image forming condition and the like to the image forming apparatus 1 by operating a switch group.

The photo-coupler 4 of the first power supply circuit 3 is connected to a two-winding latching relay 7 through a resistor 34. The two-winding latching relay 7 includes a switch 8, an open coil 9, and a close coil 10. The photo-coupler 4 is connected to the switch 8. The switch 8, the open coil 9, and the close coil 10 are covered with a cover, which is not shown in the drawing. Hence, it is difficult for a user to directly operate the switch 8.

The switch 8 is opened by the magnetic force which is generated by energizing the open coil 9. Further, the switch 8 is closed by the magnetic force which is generated by energizing the close coil 10. When neither the open coil 9 nor the close coil 10 is not energized, the switch 8 maintains a state before both coils are de-energized.

The output voltage of the first power supply circuit 3 is applied to the open coil 9 and the close coil 10 which are electromagnetic coils. A power switch 11 to be described later is operated by a user, whereby the open coil 9 is grounded through the power switch 11. The close coil 10 is grounded when the transistor 19 becomes the ON (conduction) state. In the ground state, the open coil 9 and the close coil 10 are energized when the output voltage applied from the first power supply circuit 3 is the predetermined voltage (24[V]).

A diode 17 is connected in parallel to the open coil 9 of the two-winding latching relay 7. The diode 17 suppresses change in current such that the power switch 11 or a diode 16 is not damaged by the voltage which is generated in accordance with the change in current of the open coil 9. A diode 18 is connected in parallel to the close coil 10 of the two-winding latching relay 7. The diode 18 suppresses change in current such that the transistor 19 is not damaged by the voltage which is generated in accordance with the change in current of the close coil 10. Such diodes 17 and 18 are generally used in a circuit that turns on and off an inductance load.

The switch 8 of the two-winding latching relay 7 is connected to the power switch 11. The power switch 11 is a switch which a user is able to directly operate. Specifically, the power switch 11 is being operated in a way that a user presses the switch with a user's finger.

The power switch 11 includes electrodes 12 to 14. The electrodes 12 and 14 or the electrodes 13 and 14 are selectively connected. The electrode 12 is connected to the switch 8 of the two-winding latching relay 7. The electrode 13 is connected to a connection path between the diode 16 and the open coil 9, and is brought into conduction with the control unit 6 through the diode 16. In addition, the electrode 13 is connected to the cathode side of the diode 16, and the electrode 14 is grounded. In a state where the power switch 11 is not being pressed by a user, the electrode 12 and the electrode 14 are connected, and the electrode 13 and the electrode 14 are not connected. In contrast, in a state where the power switch 11 is being pressed by a user, the electrode 12 and the electrode 14 are not connected, and the electrode 13 and the electrode are connected. FIG. 1 shows an example of the state where the power switch 11 is not being operated.

The electrode 13 of the power switch 11 is brought into conduction with the control unit 6 through the diode 16 as described above. The diode 16 prevents 24[V], which is the output voltage of the first power supply circuit 3, from being input to the control unit 6 through the open coil 9. 3.3[V], which is the output voltage of the second power supply circuit, is applied to the anode side of the diode 16 through the resistor 15.

When the power switch 11 is not being operated, the electrode 13 is in a floating state. Thereby, 3.3[V] is input to the control unit 6 through the resistor 15. When the power switch 11 is being operated, the electrode is connected to the electrode 14. Thereby, the electrode 13 is grounded. That is, the cathode of the diode 16 is grounded. Hence, 0.6[V], which is a forward voltage of the diode 16, is input to the control unit 6.

The control unit 6 monitors the input voltage, and is able to determine whether or not the power switch 11 is being operated in accordance with whether or not the input voltage is greater than for example 1.5[V] as a threshold value. When 3.3[V] is input, the input voltage to the control unit 6 is greater than 1.5[V]. Hence, the control unit 6 detects a high level, and determines that the power switch 11 is not being operated. When 0.6[V] is input, the input voltage to the control unit 6 is less than 1.5[V], the control unit 6 detects a low level, and determines that the power switch 11 is being operated.

In addition, when the power switch 11 is being operated, the electrode 13 is grounded, and as described above, the open coil 9 is energized, whereby the switch 8 is opened.

Figure 2:
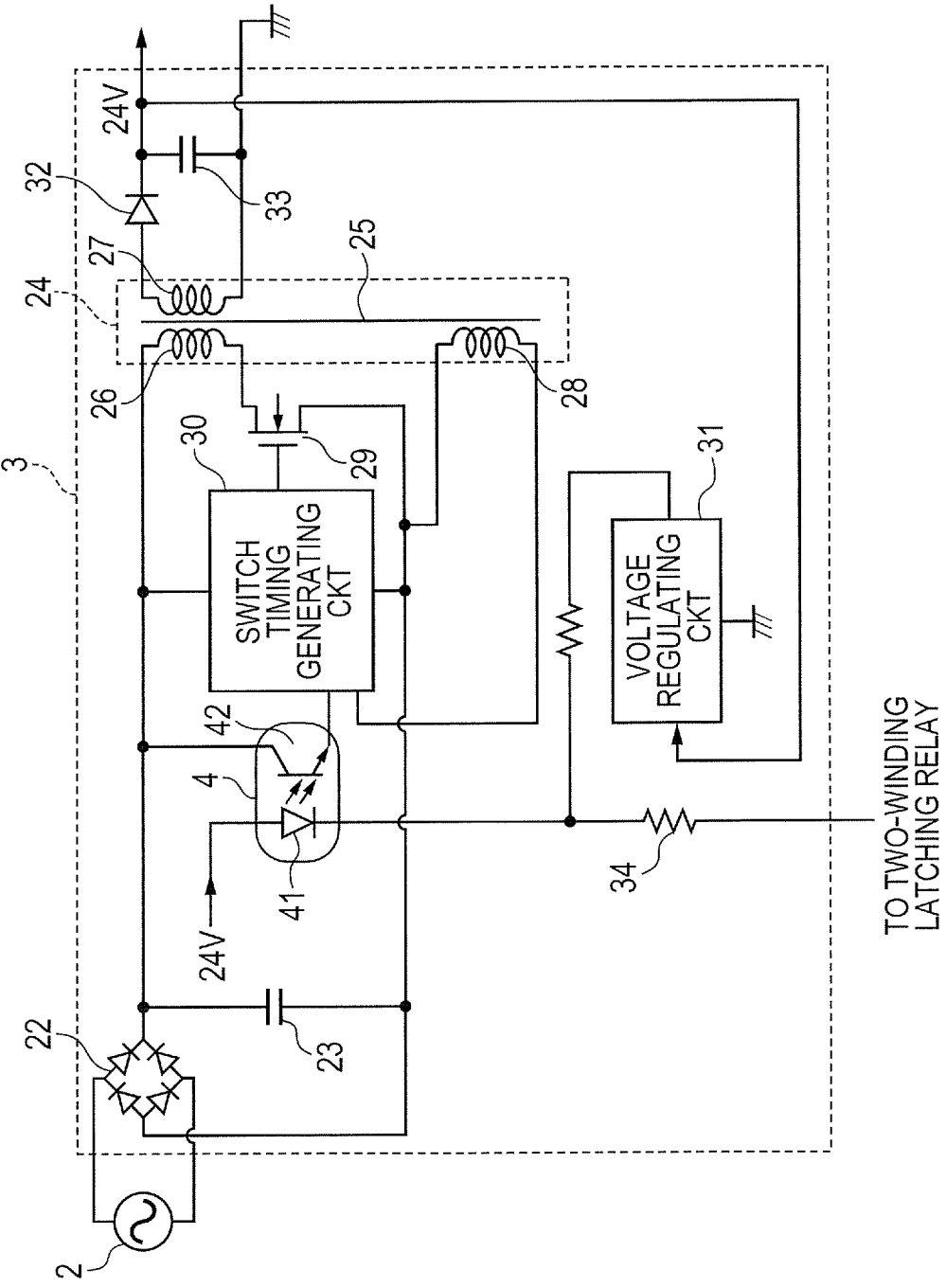
FIG. 2 is a specific configuration diagram of a first power supply circuit.

FIG. 2 is a specific configuration diagram of a first power supply circuit 3.

The AC power, which is supplied from the AC power supply 2, charges a smoothing capacitor 23 through a rectifying diode 22. For example, the capacitor 23 is charged with electric charges such that the voltage achieves 141[V]. The capacitor 23 applies the voltage to a transformer 24 by the accumulated charges. The transformer 24 includes an input coil (primary winding) 26, an output coil 27 (secondary winding), and a detection coil 28 (detecting winding wire) of the transformer 24. The respective coils are magnetically combined with a core 25. The gap between the input coil 26 and the output coil 27 is insulated against a voltage greater than or equal to 3 [kV].

The application of the voltage from the capacitor to the input coil 26 is controlled by a FET (Field Effect Transistor) 29 as a switching element. When the FET 29 is in the ON (conduction) state, the voltage is applied from the capacitor 23 to the input coil 26. In the OFF (non-conduction) state, the voltage is not applied. As the period of time during which the FET 29 is turned on/off is changed, the intensity of the magnetic field generated by the core 25 is changed, and the amount of flow of the current of the output coil 27 is changed. The ON/OFF control of the FET 29 is performed by the switch timing generating circuit 30.

The switch timing generating circuit 30 performs the ON/OFF control of the FET 29 on the basis of the output of the light receiving element 42 of the photo-coupler 4. That is, the switch timing generating circuit 3 performs the ON/OFF control of the FET 29 in accordance with the amount of current flowing in the light emitting element 41 of the photo-coupler 4. As the current flowing in the light emitting element 41 of the photo-coupler increases, the period of time, during which the FET 29 is turned off, increases. Thereby, it is possible to suppress the current flowing in the output coil 27.

The current flowing in the output coil 27 charges a smoothing capacitor 33 through a rectifying diode 32. The output voltage of the first power supply circuit 3 is output from the capacitor 33. The current flowing in the output coil 27 determines the output voltage of the first power supply circuit 3. Hence, by adjusting the current flowing in the output coil 27, the first power supply circuit 3 keeps the output voltage constant.

At a time when the electric power consumed by the image forming load section 21 is relatively large, for example, at the time of image formation, the output voltage of the first power supply circuit 3 is lowered. The voltage regulating circuit 31 senses the output voltage of the first power supply circuit 3, and thus adjusts the current flowing in the light emitting element 41 of the photo-coupler 4 in accordance with the sensing result. The voltage regulating circuit 31 decreases the current flowing in the light emitting element 41 of the photo-coupler 4 when the output voltage of the first power supply circuit 3 decreases. Thereby, the period of time, during which the FET 29 is turned on, increases, the current flowing in the output coil 27 increases, and thus the output voltage increases. The voltage regulating circuit 31 increases the current flowing in the light emitting element 41 of the photo-coupler 4 when the output voltage of the first power supply circuit 3 increases. Thereby, the period of time, during which the FET 29 is turned off, increases, the current flowing in the output coil 27 decreases, and thus the output voltage decreases. In such a manner, the first power supply circuit 3 keeps the output voltage constant. However, the voltage regulating circuit 31 adjusts the current flowing in the light emitting element 41 of the photo-coupler 4, but does not supply the current.

Further, separately from the voltage regulating circuit 31, it is possible to flow current in the light emitting element 41 of the photo-coupler 4 through the resistor 34. When the switch 8 is closed and the electrode and the electrode 14 of the power switch 11 are connected, the current flows through the resistor 34, so that the current flowing in the output coil 27 decreases, independent of the voltage regulating circuit 31, and the output voltage of the first power supply circuit 3 decreases. Since the light emitting element 41 of the photo-coupler 4 is grounded through the resistor 34, the current flows, and the output voltage of the first power supply circuit 3 is about 2[V]. As described above, by flowing current in the light emitting element 41 of the photo-coupler 4, it is possible to suppress the output voltage. As the resistance value of the resistor 34 is decreased, the output voltage is decreased. However, it is difficult to neglect loss caused by the light emitting element 41 of the photo-coupler 4. Hence, in the range of loss which can be allowed by the photo-coupler 4, the resistance value of the resistor 34 is set such that the output voltage also decreases up to a certain degree.

In accordance with the state where the two-winding latching relay 7 and the power switch 11 are opened or closed, the image forming apparatus 1 configured as described above is operated as follows.

When the power switch 11 is not being operated, the image forming apparatus 1 achieves the state of FIG. 1. The switch 8 of the two-winding latching relay 7 is opened. Hence, the light emitting element 41 of the photo-coupler 4 is not grounded. In the present specification, the state of FIG. 1 is referred to as a "power-on state" in the following description.

Figure 3:
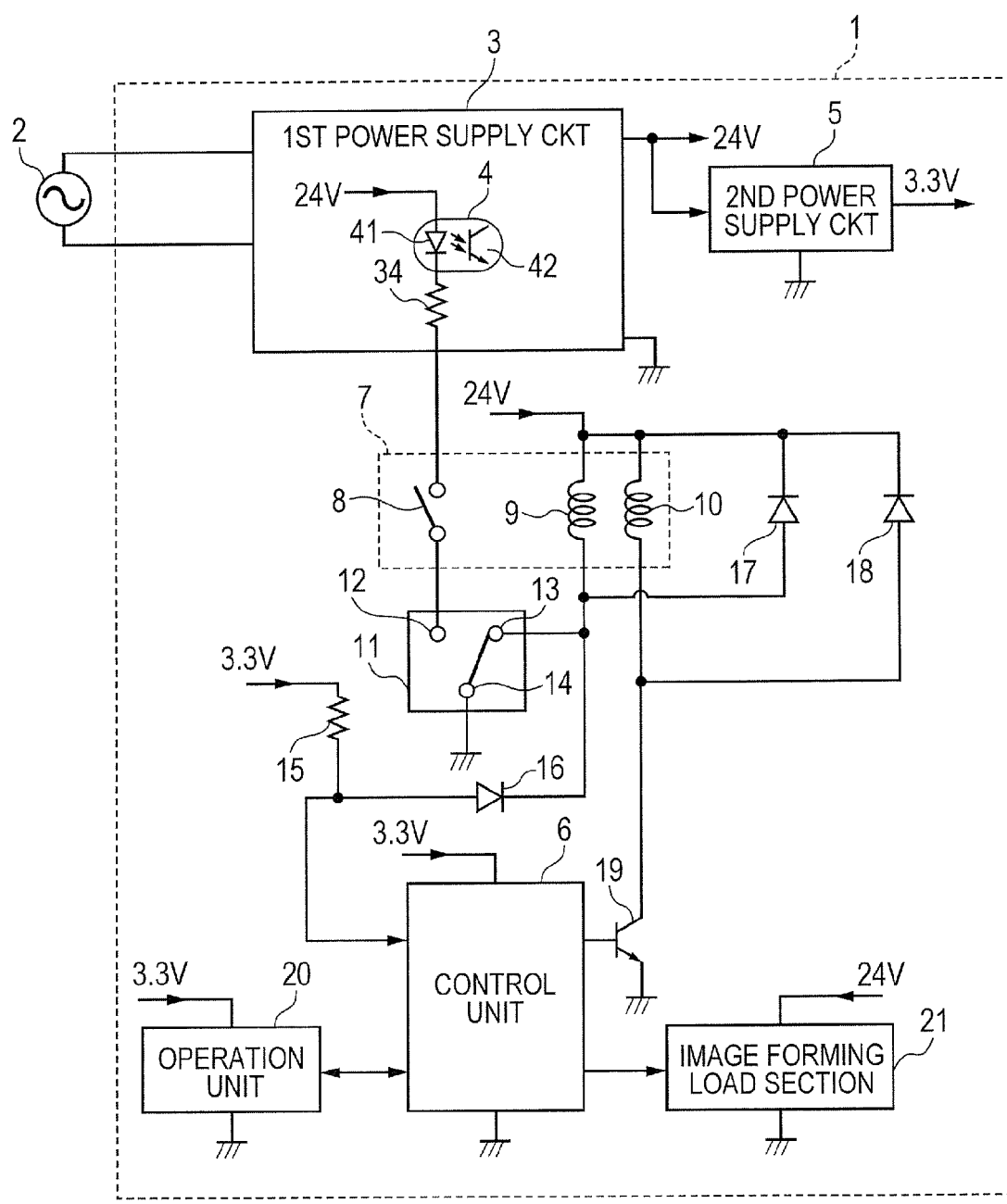
FIG. 3 is a configuration diagram of the image forming apparatus in which the configuration of the power switch portion is illustrated in detail.

When the power switch 11 is being operated, the image forming apparatus 1 is changed to the state of FIG. 3. The switch 8 of the two-winding latching relay 7 is opened, and the electrode 13 of the power switch 11 is grounded.

Figure 4:
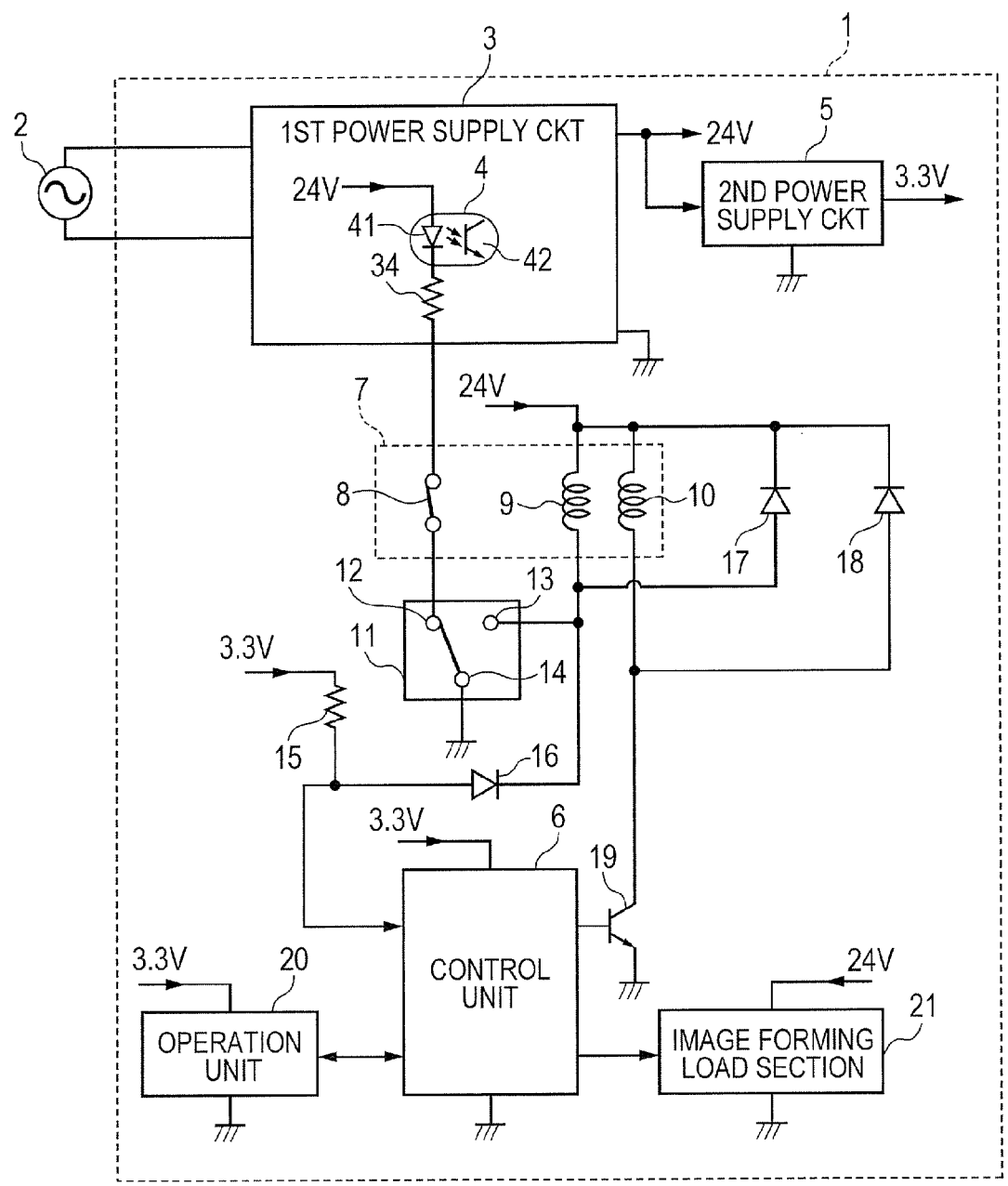
FIG. 4 is a configuration diagram of the image forming apparatus in which the configuration of the power switch portion is illustrated in detail.

FIG. 4 shows the state where the switch 8 is closed, changed from the state of FIG. 3. In this state, the power switch 11 is not being operated. Hence, the light emitting element 41 of the photo-coupler 4 is grounded through the resistor 34 and is energized. At this time, as described above, the output voltage of the first power supply circuit 3 decreases up to about 2[V]. In the present specification, the state of FIG. 4 state is referred to as a "power-off state" in the following description.

Figure 5:
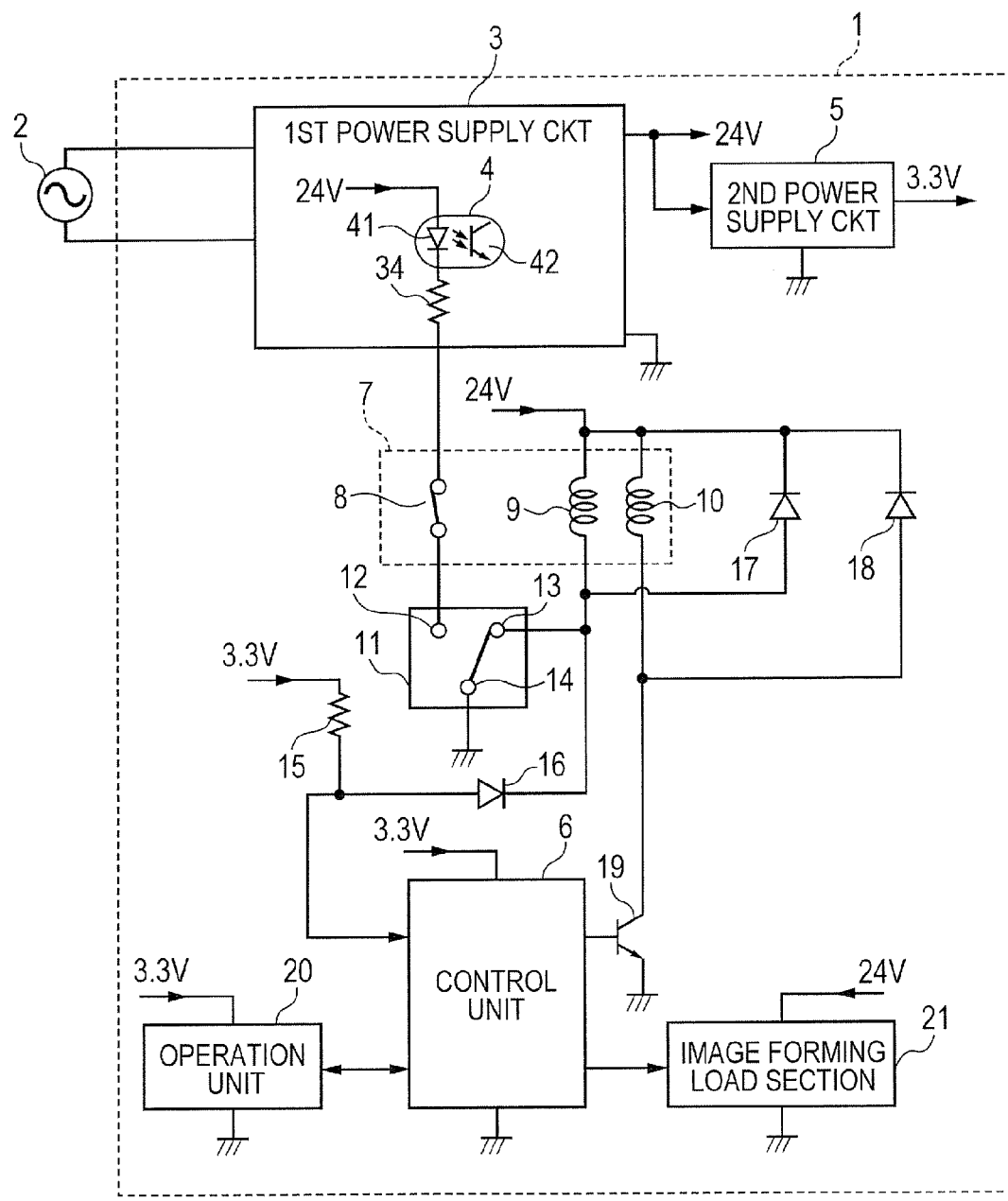
FIG. 5 is a configuration diagram of the image forming apparatus in which the configuration of the power switch portion is illustrated in detail.

FIG. 5 shows the state where the power switch 11 is being operated, changed from the state of FIG. 4. Although the switch 8 of the two-winding latching relay 7 is closed, the electrode 13 of the power switch 11 is grounded, and thus the light emitting element 41 of the photo-coupler 4 is not grounded.

There are two factors for the change from the power-on state to the power-off state. The first factor is the operation of the power switch 11. The other factor is the time when an automatic power-off mechanism for shifting to a power saving state is started due to the operation unit 20 being not operated and image formation being not performed during the predetermined period of time, for example, 2 hours. It should be noted that the power saving state is a state where power consumption of the image forming apparatus is smaller than that in the state where image formation is not performed after the image formation is completed or after the power is on.

The state where the power switch 11 is operated to shift from the power-on state into the power-off state is shown in FIG. 3. In FIG. 3, the switch 8 is opened, and there is no conduction between the electrode 12 and the electrode 14. Hence, the current does not flow in the light emitting element 41 of the photo-coupler 4 through the resistor 34. In this case, the output voltage of the first power supply circuit 3 is maintained at the constant voltage of 24[V]. Since the electrode 13 is grounded, the control unit 6 determines that a user operates the power switch 11 as described above, that is, a user issues an instruction of power off. In accordance therewith, the control unit 6 turns on the transistor 19, thereby energizing the close coil 10.

However, when the power switch 11 is being operated and the open coil 9 is energized, even if the current flows in the close coil 10, the switch 8 does not operate normally, and the current is wastefully consumed. Hence, the control unit 6 turns on the transistor 19 so as to energize the close coil 10 when the electrode 13 and the electrode 14 are not connected after the end of the operation of the power switch 11. The electrode 13 and the electrode 14 are not connected, whereby the open coil 9 is not energized. Therefore, the open coil 9 and the close coil 10 are prevented from being concurrently energized, and thus the current is prevented from being wastefully consumed. In the circuit configuration, the close coil 10 is energized in the state of FIG. 1. When the close coil 10 is energized and about 30 milliseconds have elapsed, the switch 8 is closed, thereby making the change to the power-off state of FIG. 4. In such a manner, a user operates the switch 11, whereby the image forming apparatus 1 is switched from the power-on state to the power-off state. After advance to the power-off state, the control unit 6 may stop energizing the close coil 10 by turning off the transistor 19 so as to suppress wasteful current consumption.

Even when the automatic power-off mechanism is operated, likewise, the control unit 6 makes the change to the power-off state. The automatic power-off mechanism is performed by the control unit 6. The control unit 6 counts the time during which the image forming apparatus 1 is not operated. Thus, by turning on the transistor 19 when a predetermined period of time has elapsed, the image forming apparatus 1 is switched to the power-off state.

When the power switch 11 is operated so as to change from the power-off state to the power-on state, the power-off state of FIG. 4 is changed to the state of FIG. 5. In the state of FIG. 4, the current flows in the light emitting element 41 of the photo-coupler 4 through the resistor 34. However, there is no conduction between the electrode 12 and the electrode 14 due to the operation of the power switch 11, and thus the current does not flow in the light emitting element 41. Thereby, the output voltage of the first power supply circuit 3 increases to 24[V], and is controlled to be a constant voltage. The output voltage of the first power supply circuit 3 reaches 24[V], whereby the output voltage of the second power supply circuit 5 is also output at 3.3[V]. As a result, the control unit 6 starts a normal operation. Thereby, the power-on state is achieved.

The control unit 6 stops energizing the close coil 10 by turning off the transistor 19 at the time point of start of the normal operation. The electrode 13 and the electrode 14 of the power switch 11 are brought into conduction, and therefore the current flows in the open coil 9. Thereby, the switch 8 is opened, and thus the state of FIG. 3 is achieved. At this time, the control unit 6 stops the process until it determines that the power switch 11 is not being operated. When a user terminates the operation of the power switch 11 so as to bring the electrode 12 and the electrode 14 of the power switch 11 into conduction, the image forming apparatus 1 is switched to the state of FIG. 1.

As described above, a user operates the power switch 11 in the state of FIG. 1 and thereafter terminates the operation, thereby the state of FIG. 1 is changed to the power-off state of FIG. 4 through the state of FIG. 3. Further, a user operates the power switch 11 in the power-off state of FIG. 4 and thereafter terminates the operation, thereby the state of FIG. 4 is sequentially changed to the state of FIG. 3 through the state of FIG. 5, and finally the power-on state of FIG. 1 is achieved. Furthermore, at the time of the power-on state of FIG. 1, when a predetermined period of time has elapsed in a state where the image forming apparatus is not operated and the operation unit 20 is not operated, the power-off state of FIG. 4 is achieved.

Figure 6:
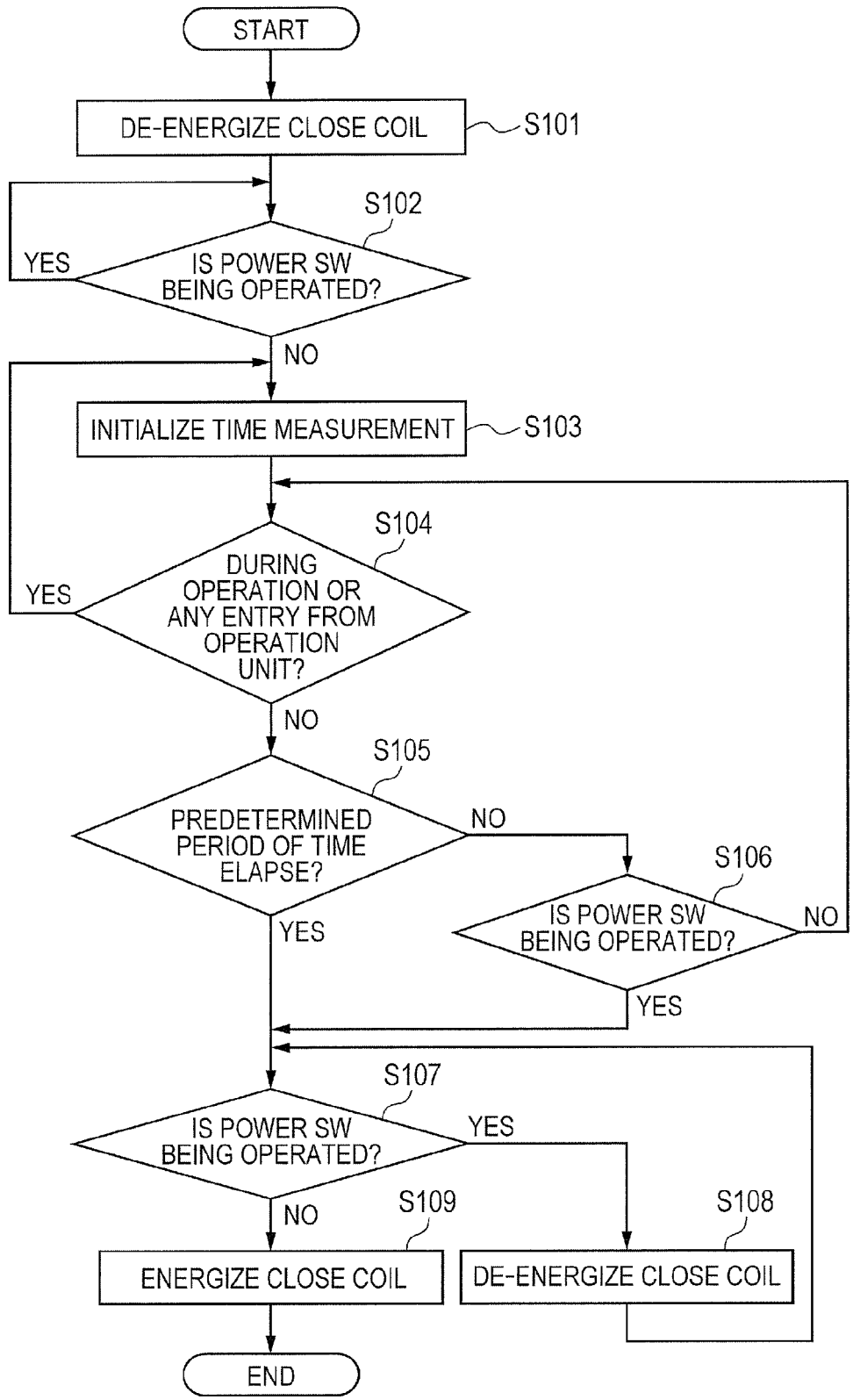
FIG. 6 is a flowchart illustrating a sequence of processes performed by the control unit.

FIG. 6 shows an example of a sequence of processes performed by the control unit 6 for switching the power-on state and the power-off state. The processes are performed in a state where the output voltage 3.3[V] of the second power supply circuit 5 as the operation voltage is applied to the control unit 6. The switching between the power-on state and the power-off state performed when the control unit 6 is not operated is not included in this flowchart.

When the operation voltage 3.3[V] is applied to the control unit 6, the control unit 6 stops energizing the close coil 10 by turning off the transistor 19 (S101). It should be noted that, normally, the transistor 19 is not energized since before the operation voltage is applied to the control unit 6. Hence, normally, even when the control unit 6 is operated, the state of the transistor 19 is maintained as it is.

The control unit 6 checks whether the power switch 11 is not being operated by a user. Specifically, if the power switch 11 is not being operated by a user, the control unit 6 repeats the process until the voltage of 3.3[V] is input and the high level is sensed (S102: N).

When it is determined that the power switch 11 is not being operated by a user, the control unit 6 initializes the time measurement, and starts the measurement of the time during which the image forming apparatus 1 is not operated (S102: Y, S103).

After the start of the time measurement, the control unit 6 determines whether the image forming apparatus 1 is being operated or whether there is an input from the operation unit 20 (S104). That is, the control unit 6 determines whether the image forming apparatus 1 is being used by a user. If a user is using the apparatus, the control unit 6 initializes the time measurement, and restarts the time measurement (S104: Y, S103). If a user does not use the apparatus, the control unit 6 determines whether the measured time is greater than or equal to a predetermined period of time (S104: N, S105).

If the measured time is less than a predetermined period of time, the control unit 6 checks whether the power switch 11 is being operated by a user (S105: N, S106). If the power switch 11 is being operated by a user, the voltage of 0.6[V] is input to the control unit 6, and therefore the control unit 6 senses the low level.

If the power switch 11 is not being operated by a user, the control unit 6 returns to the process of step S104, and determines whether the image forming apparatus 1 is forming an image or whether there is the input from the operation unit 20 (S106: N, S104). If the power switch 11 is being operated by a user, the control unit 6 determines the end of the operation of the power switch 11 performed by a user (S106: Y, S107). The end of the operation of the power switch 8 is determined in a case where the voltage of 3.3[V] is input to the control unit 6 and the high level is sensed. Further, even if the measured time is greater than or equal to a predetermined period of time in S105, the control unit 6 determines the end of the operation of the power switch 11 performed by a user (S105: Y, S107). That is, in the processes of steps S103 to S106, if a period of time during which a user does not use the image forming apparatus 1 is greater than a predetermined period of time or the power switch 11 is being operated by a user, the process advances to step S107. Otherwise, the process remains in the processes of steps S103 to S106.

If the power switch 11 is being operated by a user, that is, if the voltage of 0.6[V] is input and the low level is sensed, the control unit 6 stops energizing the close coil 10 by turning off the transistor 19 (S107: N, S108). If the transistor 19 is already turned off, the control unit 6 maintains the off state. If the transistor 19 is turned on, the control unit 6 makes the change to the off state. Thereby, the state of FIG. 5 is achieved. The control unit 6 stops energizing the close coil 10, returns to step S107, and rechecks the end of the operation of the power switch 11 performed by a user. That is, the control unit 6 repeats the processes of steps S107 and S108 until the operation of the power switch 11 performed by a user ends.

If the power switch 11 is not being operated by a user, that is, if the voltage of 3.3[V] is input and the high level is sensed, the control unit 6 energizes the close coil 10 by turning on the transistor 19 (S107: Y, S109). Thereby, the power-off state of FIG. 4 is achieved, and the current flows in the light emitting element 41 of the photo-coupler 4 through the resistor 34, and the output voltage of the first power supply circuit 3 decreases. When the power-off state is achieved, the control unit 6 monitors whether the power switch 11 is being operated by a user. If there is the operation, the process for achieving the power-on state is performed. Hence, the process returns to, for example, step S107.

In the above-mentioned process, the control unit 6 switches the power-on state and the power-off state by the change to the power saving state or the operation of the power switch 11 performed by a user.

As described above, the power switch 11 is being operated by a user in step S106, and the process advances to step S107. If the power switch 11 is being continuously operated by a user in step S107, the processes of steps S107 and S108 are repeated. At this time, since the power switch 11 is being operated by a user, the open coil 9 is energized without the control of the control unit 6.

In this state, if the control unit 6 turns on the transistor 19, the close coil 10 is energized. Hence, both of the open coil 9 and the close coil 10 are energized. In this state, the forces, which open and close the switch 8, are mutually canceled, and thus the switch 8 is maintained to be open without being operated. When the switch 8 is maintained to be open, the current does not flow in the light emitting element 41 of the photo-coupler 4, and thus the output voltage of the first power supply circuit 3 does not decrease. Hence, as long as a user is continuously operating the power switch 11, both of the open coil 9 and the close coil 10 are being continuously energized. When both of the open coil 9 and the close coil 10 are being continuously energized, compared with the case where only one of the coils is energized, the amount of heat generated in the two-winding latching relay 7 increases. This is a waste of energy, and the increase in temperature caused by the heat generation causes damage to the two-winding latching relay 7 if heat dissipation of the two-winding latching relay 7 is small. Generally, the latching relay capable of dissipating a large amount of heat tends to have a large size, and the latching relay with a small size tends to dissipate a small amount of heat.

It is preferable that the size of the image forming apparatus 1 be set to be small such that the place in which the image forming apparatus 1 is installed is small. Hence, it is preferable that the size of the two-winding latching relay 7 be small. In the embodiment, the two-winding latching relay 7, from which a small amount of heat is dissipated, is used. Further, in steps S107 and S108, both of the open coil 9 and the close coil 10 are not being continuously concurrently energized. Hence, the two-winding latching relay 7 is not damaged by the increase in temperature. In addition, in the processes from step S106 or step S109 to step S107, when the power switch 11 is being operated by a user, the energizing of the close coil 10 is stopped in step S107. Hence, both of the open coil 9 and the close coil 10 are not being continuously energized.

As described above, in the embodiment, the power switch 11, which a user is able to directly operate, has a simple configuration in which the latching relay is not used, and the switch 8 of the two-winding latching relay 7, which a user is unable to directly operate, has a configuration in which the electromagnetic coil is used. In such a configuration, in order to prevent the erroneous operation of the switch 8, a large operational force is not necessary. Hence, it is possible to reduce the sizes of the open coil 9 and the close coil 10. As a result, it is possible to reduce the size of the entire apparatus, and thus it is possible to achieve a reduction in costs. Further, it is possible to reduce the amount of current flowing in the open coil 9 and the close coil 10, and thus a small capacity of the power supply used to energize the open coil 9 and the close coil 10 may be realized. As a result, at the standby time during which image formation is not performed and at the time of the power saving mode, it is possible to save more power.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-094781, filed Apr. 18, 2012, which is hereby incorporated by reference herein in its entirety.

What is claimed is:

1. An image forming apparatus, comprising:
   an image forming unit configured to form an image on a recording medium;
   a power supply unit to which AC power is input and which outputs a DC voltage for operating the image forming unit;
   a relay switch of which opening/closing is controlled by the DC voltage output from the power supply unit being applied to a coil of the relay switch;
   a power switch which is manually operated to switch ON/OFF of the power supply for the image forming apparatus, and achieves a first state when not manually operated and achieves a second state when manually operated, the power switch being connected to the relay switch in series, and the relay switch being put into an open state when the power switch is in the second state and the relay switch being put into a closed state when the power switch is in the first state;
   a voltage suppressing unit configured to reduce the DC voltage to less than a predetermined value when the relay switch is in a closed state and the power switch is in the first state; and
   a control unit configured to close the relay switch so as to reduce the DC voltage to less than the predetermined value in order to put the image forming apparatus into a power-off state, if the power switch is changed to the second state and thereafter is changed to the first state, when the power switch is in the first state and the DC voltage is not reduced to less than the predetermined value.

2. The image forming apparatus according to claim 1, wherein a state where the power supply of the image forming apparatus is turned on is a state where the relay switch is opened and the power switch is in the first state, and a state where the power supply of the image forming apparatus is turned off is a state where the relay switch is closed and the power switch is in the first state.

3. The image forming apparatus according to claim 2, wherein the relay switch includes a first coil that opens the relay switch by being energized, and a second coil that closes the relay switch by being energized.

4. The image forming apparatus according to claim 3, wherein the power switch is adapted such that the relay switch is energized by an output of the power supply unit when the relay switch is closed in the first state and the first coil is energized in the second state.

5. The image forming apparatus according to claim 4, wherein the control unit energizes the second coil when the power switch is in the first state and the DC voltage is not reduced to less than the predetermined value, and stops energizing the second coil when the power switch is in the first state and the DC voltage is reduced to less than the predetermined value.

6. The image forming apparatus according to claim 2, further comprising an operation unit which inputs an instruction for the image forming apparatus,
wherein when the image forming apparatus is not operated and an operation for the operation unit is not performed during a predetermined period of time, in the state where the power of the image forming apparatus is turned on, the control unit closes the first switch so as to reduce the DC voltage to less than the predetermined value.

7. The image forming apparatus according to claim 3, further comprising an operation unit that inputs an instruction for the image forming apparatus,
wherein when the image forming apparatus is not operated and an operation for the operation unit is not performed during a predetermined period of time, in the state where the power of the image forming apparatus is turned on, the control unit energizes the second coil.

8. The image forming apparatus according to claim 2, wherein the power switch is connected to the control unit through a diode in the second state, a predetermined voltage is applied to an anode side of the diode through a resistor, and the predetermined voltage is input to the control unit through the resistor, and the control unit detects that the power switch achieves the second state on the basis of change in the voltage, which is input to the control unit, when the power switch achieves the second state.

9. The image forming apparatus according to claim 8, wherein the power switch is adapted such that a cathode side of the diode is grounded in the second state.

10. The image forming apparatus according to claim 1, wherein the power supply unit includes:
a transformer;
a switching element which is connected to a primary winding of the transformer; and
a switch timing generating circuit which increases a period of time, during which the switching element is turned off, when the relay switch is closed and the power switch is in the first state.

\* \* \* \* \*